United States Patent
Silverman

(10) Patent No.: US 9,177,313 B1
(45) Date of Patent: Nov. 3, 2015

(54) SYSTEM AND METHOD FOR ISSUING, CIRCULATING AND TRADING FINANCIAL INSTRUMENTS WITH SMART FEATURES

(75) Inventor: Robert Michael Silverman, Westfield, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1818 days.

(21) Appl. No.: 11/874,416

(22) Filed: Oct. 18, 2007

(51) Int. Cl.
G06Q 20/00 (2012.01)
G06F 17/00 (2006.01)
G06Q 20/36 (2012.01)

(52) U.S. Cl.
CPC ................................ *G06Q 20/367* (2013.01)

(58) Field of Classification Search
USPC ........................................................... 705/65
See application file for complete search history.

(56) References Cited

U.S. PATENT DOCUMENTS

| | | | |
|---|---|---|---|
| 4,625,276 A * | 11/1986 | Benton et al. ................... 705/44 |
| 4,759,063 A | 7/1988 | Chaum |
| 4,759,064 A | 7/1988 | Chaum |
| 4,914,698 A | 4/1990 | Chaum |
| 4,947,430 A | 8/1990 | Chaum |
| 4,949,380 A | 8/1990 | Chaum |
| 4,987,593 A | 1/1991 | Chaum |
| 4,991,210 A | 2/1991 | Chaum |
| 4,996,711 A | 2/1991 | Chaum |
| 5,131,039 A | 7/1992 | Chaum |
| 5,276,736 A | 1/1994 | Chaum |
| 5,373,558 A | 12/1994 | Chaum |
| 5,434,919 A | 7/1995 | Chaum |
| 5,493,614 A | 2/1996 | Chaum |
| 5,604,805 A | 2/1997 | Brands |
| 5,606,617 A | 2/1997 | Brands |
| 5,668,878 A | 9/1997 | Brands |
| 5,696,827 A | 12/1997 | Brands |
| 5,712,913 A | 1/1998 | Chaum |
| 5,781,631 A | 7/1998 | Chaum |
| 5,878,140 A | 3/1999 | Chaum |
| 6,039,247 A * | 3/2000 | Reccia et al. ................. 235/379 |
| 6,052,467 A | 4/2000 | Brands |
| 6,138,107 A | 10/2000 | Elgamal |
| 6,148,084 A | 11/2000 | Brands |
| 6,320,966 B1 | 11/2001 | Brands |
| 6,327,578 B1 * | 12/2001 | Linehan ........................... 705/65 |
| 6,434,403 B1 * | 8/2002 | Ausems et al. ............ 455/556.2 |
| 6,510,516 B1 | 1/2003 | Benson et al. |

(Continued)

OTHER PUBLICATIONS

Wei Dai, bmoney.pdf, updated, http://www.wiedal.com/bmoney.txt.

(Continued)

*Primary Examiner* — Zeshan Qayyum
(74) *Attorney, Agent, or Firm* — Goodwin Procter LLP

(57) ABSTRACT

A system and method for issuing, circulating and trading financial instruments with smart features is disclosed. In one particular exemplary embodiment, a financial instrument having smart features may comprise a document portion and a token device attached to or embedded in the document portion. The token device may comprise a storage device and a communication interface, wherein the token device is configured to provide a unique address for the financial instrument, the unique address including a device identifier that matches at least in part the document portion and a network address that changes based on a network location of the financial instrument and to communicate securely with an external entity at least to report an identity or a status of the financial instrument.

13 Claims, 11 Drawing Sheets

(56) References Cited

U.S. PATENT DOCUMENTS

| | | |
|---|---|---|
| 6,598,028 B1 | 7/2003 | Sullivan et al. |
| 6,860,422 B2 * | 3/2005 | Hull et al. ............... 235/376 |
| 7,233,922 B2 | 6/2007 | Asher et al. |
| 7,487,123 B1 | 2/2009 | Keiser et al. |
| 7,584,362 B2 | 9/2009 | Paya et al. |
| 7,607,574 B2 * | 10/2009 | Kingsborough et al. ..... 235/380 |
| 7,624,421 B2 | 11/2009 | Ozzie et al. |
| 7,645,194 B2 | 1/2010 | Van Luchene et al. |
| 7,647,252 B2 | 1/2010 | Rampell et al. |
| 7,693,781 B2 | 4/2010 | Asher et al. |
| 7,809,641 B2 | 10/2010 | Bowers et al. |
| 7,853,529 B1 * | 12/2010 | Walker et al. ................ 705/55 |
| 7,945,514 B1 | 5/2011 | Bowers et al. |
| 8,156,047 B1 | 4/2012 | Bowers et al. |
| 8,271,310 B2 | 9/2012 | Flake et al. |
| 8,621,602 B2 | 12/2013 | Van et al. |
| 2003/0028483 A1 | 2/2003 | Bowers et al. |
| 2004/0049567 A1 * | 3/2004 | Manchin ................ 709/223 |
| 2004/0050930 A1 * | 3/2004 | Rowe ................ 235/380 |
| 2004/0210507 A1 | 10/2004 | Asher et al. |
| 2004/0230489 A1 * | 11/2004 | Goldthwaite et al. ......... 705/26 |
| 2004/0267921 A1 * | 12/2004 | Rover et al. ................ 709/223 |
| 2005/0073389 A1 * | 4/2005 | Chandley ................ 340/5.31 |
| 2007/0118891 A1 * | 5/2007 | Buer ................ 726/8 |
| 2007/0207849 A1 | 9/2007 | Asher et al. |
| 2007/0208642 A1 | 9/2007 | Asher et al. |
| 2008/0154741 A1 | 6/2008 | Flake et al. |
| 2011/0130189 A1 | 6/2011 | Asher et al. |
| 2012/0231865 A1 | 9/2012 | Asher et al. |
| 2012/0231871 A1 | 9/2012 | Asher et al. |
| 2012/0310858 A1 | 12/2012 | Stanley |
| 2013/0012303 A1 | 1/2013 | Asher et al. |
| 2013/0046710 A1 | 2/2013 | Kartoun et al. |

OTHER PUBLICATIONS

Nick Szabo, Secure Property Titles with Ownser Authority.pdf, 2005, http://szabo.best.vwh.net/securetitle.html.

Nick Szabo, Unenumerated_Bit gold.pdf, Dec. 27, 2008 http://unenumerated.blogspot.com/2005/12/bit-gold.html.

Satoshi Nakamoto, bitcoin.pdf, 2008 https://bitcoin.org.bitcoin.pdf

* cited by examiner

SYSTEM AND METHOD FOR ISSUING, CIRCULATING AND TRADING FINANCIAL INSTRUMENTS WITH SMART FEATURES

FIELD OF THE INVENTION

The present invention relates generally to computers and communications. More particularly, the present invention relates to a system and method for issuing, circulating and trading financial instruments with smart features.

BACKGROUND OF THE INVENTION

Financial instruments play an important role in the modern society. A large number of financial instruments are issued and circulated everyday to serve as proof of ownership or to facilitate monetary transactions. Each financial instrument is typically either a physical or virtual document having some monetary value and/or recording a monetary transaction. The most common examples of financial instruments include cash instruments such as banknotes, stock certificates, bonds, checks, promissory notes, and certificates of deposit. More complex examples of financial instruments include derivative instruments such as options, futures, swaps and forwards which reference one or more underlying assets (e.g., asset classes of debt, equity, or foreign exchange).

For purposes of the present invention, financial instruments may be or include any type of documents, instruments, or objects (real or logical) that can be transferred from one party to another or play a role in business or financial transactions. One example may include payment media such as credit cards, debit cards, smart cards, stored value cards, gift cards, and the like. Another example may include bills of lading, letters of credit, and repurchase agreements. Financial instruments in accordance with the present invention may also include lottery tickets, raffle tickets, gaming chips, admission tickets, or other papers or objects that represent or provide (conditional or unconditional) monetary value or other types of entitlements to holders or accepters of such papers or objects. Furthermore, a financial instrument in accordance with the present invention may be or include a virtual instance, such as a unit of transaction data associated with one or more physical or virtual instruments.

Some financial instruments, such as those held within accounts, are continuously tracked and accounted for once they are issued or created. For example, physical copies of registered stock certificates typically are not passed from one stockholder to another. Instead, brokerage firms often keep physical custody of registered stock certificates and track ownership and transfers of the stocks in connection with investment accounts. A current record of true stock owners is also maintained by the stock-issuing corporation in a stockholder's register, usually based on periodic reports from the brokerage firms. Other securities, such as bonds and treasury bills, may be tracked with individual accounts in a similar fashion.

On the other hand, many financial instruments are circulated among various entities independent of accounts and/or without being tracked or traced, much like bearer papers. For example, banknotes can be passed from one private party to another in cash transactions. A negotiable instrument, such as a check, a bank draft, a money order, or a promissory note, can be transferred with a holder's signature. Such transactions can take place in secret and between anonymous parties, without detection by authorities. There is often a legal duty to report monetary transactions, for example for taxation or accounting purposes or to prevent funding of criminal activities. Failure to report certain financial activities (e.g., large amount of cash transactions or significant income) may lead to civil and/or criminal penalties.

However, without any mechanism to detect private transactions involving untraceable financial instruments, the authorities have to rely on voluntary self-reporting, periodic auditing or other imperfect mechanisms to enforce statutory or regulatory reporting duties for cash-based transactions and "cash businesses." Self-reporting relies on the knowledge and volition of private parties involved in monetary transactions. For a monetary transaction to be adequately reported, at least one party involved therein must both know that there is a duty to report and be willing to fulfill that duty. Ignorance of the law or substantial financial incentives can prevent persons or entities from reporting their transactions. Sporadic auditing by the authorities can only catch a small fraction of violations such as tax evasion and money laundering.

While holding securities and recording transactions within an account-framework helps mitigate against failures to report or to comply with regulations, accounts do not completely prevent such fraud. Moreover, holding securities and performing transactions within an account-based framework necessarily forces a "middle-man" relationship resulting in fees having to be paid by the account-holder, restriction of the ability of the account-holder to operate completely freely, and in time-delays in executing transactions on behalf of the account holder. An example of the costs and shortcomings of such a middle-man relationship is the trading of financial instruments within the context of a stock market. Today's stock markets require costly, complex centralized services to connect buyers and sellers, and to provide pricing for and clearing of trades. Securities traded must be held in accounts, which adds costs and delays to trading. For example, Securities and Exchange Commission (SEC) regulations require that the brokerage maintain proof that orders, once entered by a customer, have been executed at the best price and as quickly as possible. Brokerages must therefore construct, support, and maintain costly infrastructure to receive, monitor, timestamp, record, and maintain records for all trades. Yet, even with all of this infrastructure and expenditure, the intent of speed and fairness on behalf of the customer is only partially met, for there is no regulation or fairness for what can be the most time-consuming portion of the process, namely the notification and provision of trading instructions by the customer to the brokerage concerning the trade.

In view of the foregoing, it may be understood that there are significant problems and shortcomings associated with current technologies for tracking financial instruments and related transactions. The problems and shortcomings may exist with respect to both account-based and non-account-based financial instruments and transactions.

SUMMARY OF THE INVENTION

A system and method for issuing, circulating, and trading financial instruments with smart features is disclosed. In one particular exemplary embodiment, a financial instrument having smart features may be provided. The financial instrument may comprise: a document portion; and a token device attached to or embedded in the document portion, the token device comprising a storage device and a communication interface, wherein the token device is configured to provide a unique address for the financial instrument, the unique address including a device identifier that matches at least in part the document portion and a network address that changes based on a network location of the financial instrument and to communicate securely with an external entity at least to report an identity or a status of the financial instrument in order to enable or facilitate valuation, regulatory compliance, tracking, or trading of the instrument.

In another particular exemplary embodiment, a method for issuing, circulating and trading financial instruments having smart features may be implemented. The method may comprise the steps of: associating a token device with a financial instrument, the token device having a unique address including a device identifier and a network address that changes based on a current network location of the token device, a storage medium to record financial parameters of the financial instrument, at least a portion of the financial parameters being encoded into the device identifier, and one or more communication capabilities; issuing the financial instrument with the token device as a requisite component for a validity of the financial instrument; and tracking the financial instrument by communicating with the token device for at least once subsequent to the issuance of the financial instrument.

In yet another particular exemplary embodiment, a method for issuing, circulating and trading financial instruments having smart features may be implemented. The method may comprise the steps of: embedding a token device within a financial instrument, the token device comprising a processor, a storage medium, and a communication interface; assigning a unique address to the token device, the unique address including a device identifier and a network address that changes based on a current network location of the token device; recording one or more financial parameters of the financial instrument in the storage medium of the token device, at least a portion of the financial parameters being encoded in the device identifier; issuing the financial instrument with the token device as a requisite component for a validity of the financial instrument; and tracking the financial instrument and monetary transactions involving the financial instrument by securely communicating with the token device for at least once subsequent to the issuance of the financial instrument.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention provide for financial instruments with smart features, which may be referred to as "smart financial instruments." A unit of one or more financial instruments may comprise a document portion with a token device attached to or embedded in the document portion. Validity of the underlying financial instrument(s), such as title of ownership and right to transfer, may require co-presence and validity of both the document portion and the token device. Alternatively, a token device itself may be or represent a unit of one or more financial instruments. The token device may have one or more smart features, including but not limited to: unique addressability (e.g., fixed identifier and variable network address) and traceability, security mechanisms (e.g., data encryption/decryption and authentication), self-awareness and intelligence (i.e., aware of others), one or more communication capabilities (e.g., self-reporting and peer-to-peer communications), and ability to participate in grid computing. These smart features, individually or in combination, may enable tracking of financial instruments and transactions related thereto, thereby facilitating automated accounting, supervision, reporting and taxation functions. The smart features may also facilitate a wide variety of operations or transactions with the financial instruments, such as splitting and aggregation, association with accounts or other instruments, value fluctuation and determination, and automated auction or price-negotiation. The smart financial instruments, including token devices, may be implemented in either physical or virtual forms, as will be described in detail below.

Figure 1:
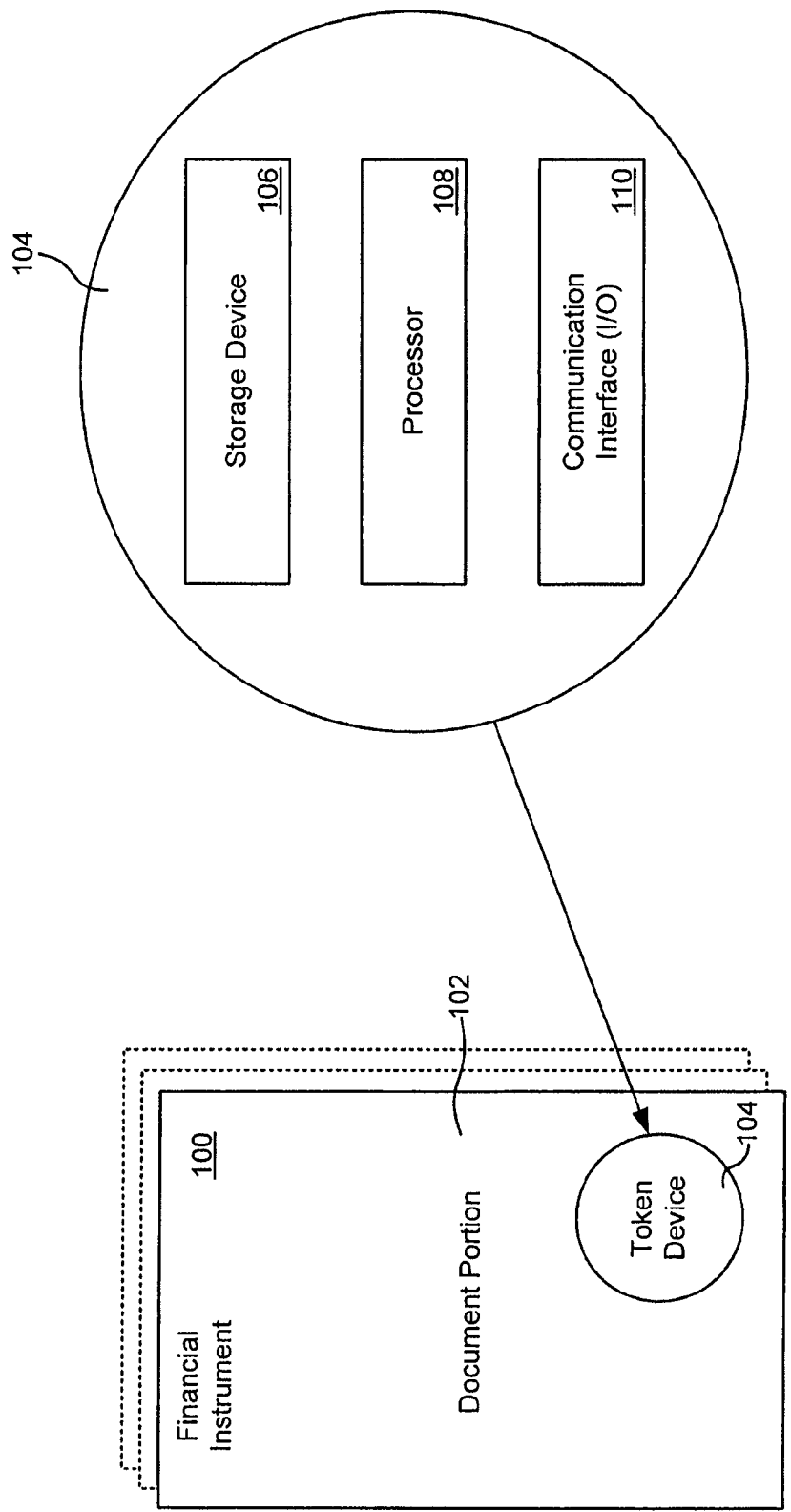
FIG. 1 shows a block diagram illustrating an exemplary financial instrument having a physical implementation in accordance with embodiments of the present invention.

Referring to FIG. 1, there is shown a block diagram illustrating an exemplary financial instrument 100 having a physical implementation in accordance with embodiments of the present invention. The financial instrument 100 may be a single piece of financial instrument having a document portion 102 and a token device 104 attached to or embedded in the document portion 102. Alternatively, the financial instrument 100 may include two or more pieces of financial instruments. The financial instrument 100 may be or comprise any type of equity, debit, currency, or payment instruments. The document portion 102 may comprise a physical medium that records information of the financial instrument 100 with text, symbols and/or bar codes. The document portion 102 may be human readable, machine readable, or both.

The token device 104 may be a low-power device that can be either internally or externally powered. The token device 104 may include a storage device 106, a processor 108, and a communication interface 110 (or an input/output (I/O) interface). The communication interface 110 may enable the token device 104 to communicate with a remote entity over a network, to communicate with other token devices (peer-to-peer), and/or to communicate locally with a human and/or an external device. For example, the communication interface 110 may be coupled to an external device having a keypad, a display, and/or an audio output. The communication interface 110 and/or the external device may further accommodate biometrics- or password-based access control to the token device 104. With the communication interface 110, the token device may communicate with an owner of the financial instrument 100, an administrator or other authorized persons, for example, to report value changes and to receive instructions or updates. According to some embodiments of the present invention, the onboard processor 108 may be optional, and the token device 104 may rely on an external device (e.g., a token reader/writer) for data processing functions. The token device 104 is preferably small enough in size, so as not to affect portability of the financial instrument 100. Accordingly, the components (106, 108, and 110) may be integrated on one or more miniaturized chips. Further design detail of token devices will be provided below in connection with FIG. 2.

The token device 104 may be either permanently integrated with or detachably appended to the document portion 102. The token device 104 may contain or be encoded with information that matches the document portion 102. Where the token device 104 is permanently integrated with the document portion 102, authenticity of the financial instrument 100 may be verified by comparing information content of the token device 104 with that of the document portion 102 or a separately maintained data record. Where the token device 104 is detachably appended to the document portion 102, it may be required that both the token device 104 and the document portion 102 be present and valid (i.e., have not been tampered with and contain matching information) in order for the financial instrument 100 to be authenticated and fully functional. Otherwise, the financial instrument 100 may neither be recognized as a proper proof of ownership nor be eligible for transfer or exchange. Since co-presence of the token device 104 and the document portion 102 is required, the two pieces may be detached from each other and stored in separate places for safekeeping purposes. According to one embodiment of the present invention, in a partial or conditional transfer of the financial instrument 100, such as in a mortgage situation with the financial instrument 100 as collateral or in an installment sale, a transferor (mortgagor/seller) may deliver to a transferee (mortgagee/buyer) either the document portion 102 or the token device 104 and maintain custody of the other piece until a later time when full delivery is required or when the delivered piece is returned.

The financial instrument 100 may have either a fixed or variable value. An example of a fixed-value financial instrument may be a banknote or a check, wherein the fixed value (e.g., dollar amount) may be recorded in the storage device 106. An example of a variable-value financial instrument may be a share of stock or a treasury bill whose value fluctuate with market conditions. For a variable-value financial instrument, the associated token device 104 may periodically calculate and update the value based on valuation rules and market data.

The financial instrument 100 may have an infinite lifespan or have a predetermined expiration date. The token device 104 may be configured to cause the financial instrument to expire at a predetermined time and date or upon certain triggering events or conditions.

Ownership of the financial instrument 100 may depend on an association with one or more financial accounts. Alternatively, the financial instrument 100 may by itself serve as a physical instantiation of ownership and be independent of conventional database-recorded accounts. In addition, the financial instrument 100 may flexibly record ownership arrangements wherein various interests or rights related to the financial instrument 100 may belong to different entities. For example, with respect to a share of common stock, the voting right may belong to a first entity, the right to receive dividend may belong to another entity, and the right to receive sale proceeds may belong to yet another entity. Such a complex allocation of ownership interests or rights may be recorded in the token device 104 and be enforced in relevant transactions.

Figure 2:
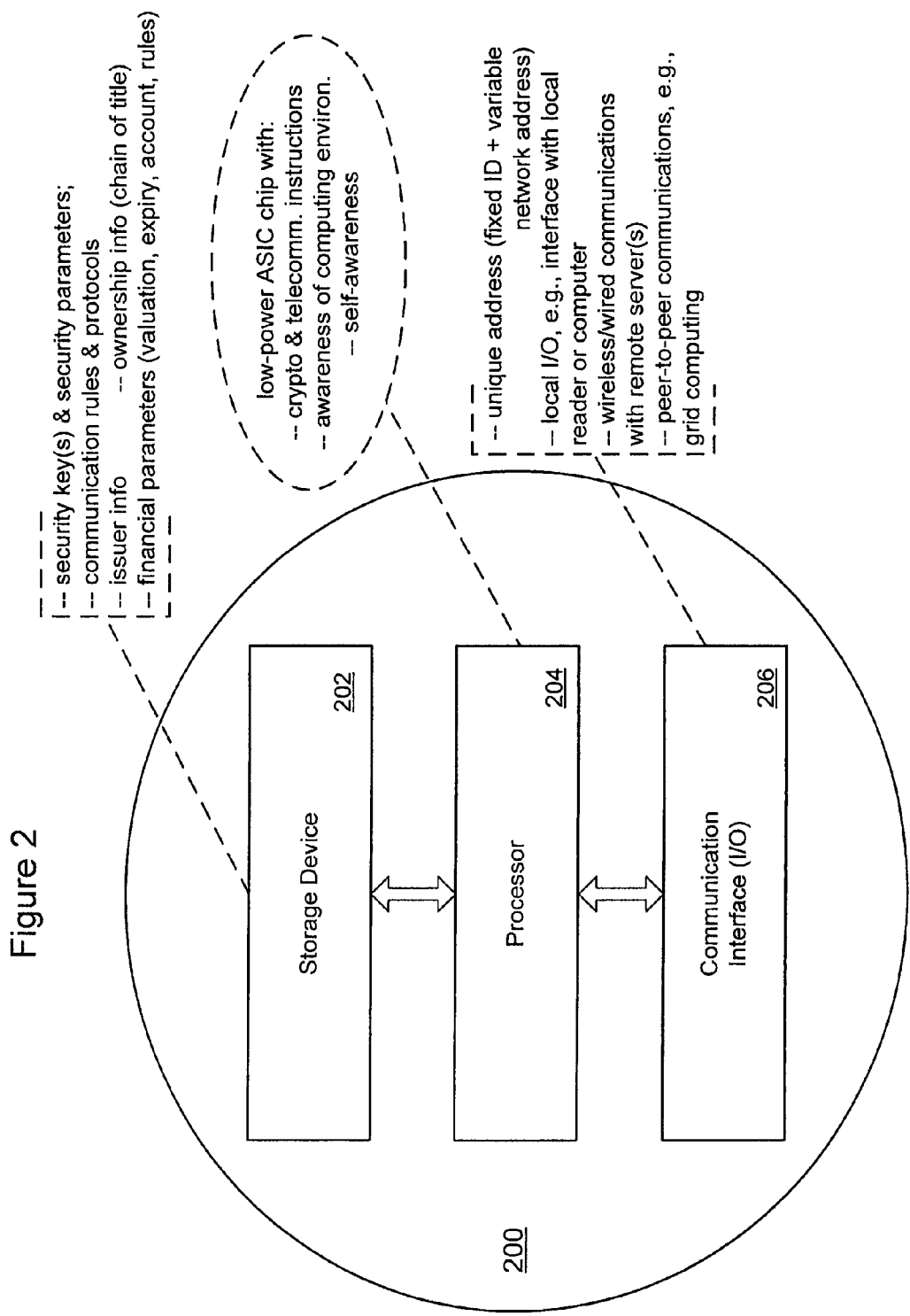
FIG. 2 shows a block diagram illustrating another exemplary financial instrument in accordance with an embodiment of the present invention.

FIG. 2 shows a block diagram illustrating an exemplary token device 200 in accordance with an embodiment of the present invention. The token device 200 may be attached to or embedded in a financial instrument (not shown). The token device 200 may comprise a storage device 202, a processor 204, and a communication interface 206, which are designed and configured to implement smart features for an associated financial instrument.

The storage device 202 may comprise a non-volatile memory (NVM), a magnetic memory, or other type of storage medium that has a sufficient space to hold, among other things, information regarding the financial instrument and related transactions. The processor 204 may be implemented with a low-power application-specific integrated circuit (ASIC) chip. The communication interface 206 may comprise hardware, software and/or firmware for local and/or remote communication functions.

According to some embodiments of the present invention, some or all of these components (202, 204, and 206) may be configured according to Internet Protocol Version 6 (IPv6), IP Security protocols (IPsec), ZigBee, and/or other communication protocols.

For example, the token device 200 may be assigned a unique IP address having a relatively fixed identification portion (e.g., a unique identifier of the token device 200 itself plus some indicator bits/bytes for financial category, trading intent, and current status etc.) and a variable network portion (i.e., a mobile prefix or care-of address) that changes based on a network location of the token device 200. The unique IP address may be assigned to the communication interface 206 and recorded in the storage device 202. According to one embodiment of the present invention, a fixed portion of the IP address may be hard-wired or otherwise permanently recorded in the storage device 202, the processor 204, and/or the communication interface 206. A variable portion of the IP address may be recorded in the storage device 202 and be overwritten by the processor 204 whenever it senses a transition into a different network location or other changes in status. The storage device 202 may optionally maintain a history of the variable network addresses. The above-described addressing scheme may enable tracking of the token device 200 (and hence the financial instrument associated therewith).

The token device 200 may interact with external devices, such as a token reader/writer, a server, or other token devices (peers), based on communication rules and protocols (e.g., IPv6 and IPsec). The storage device 202 may be loaded with the communication rules and protocols. The processor 204 may execute telecommunication instructions in accordance with the communication rules and protocols. The communication interface 206 may support local I/O functions (e.g., with a reader device or computer), client-host communications with remote servers, and/or peer-to-peer communications with other token devices. The local I/O functions may enable human interactions with the token device 200, for example, via an external keyboard/keypad, biometric scanning devices (e.g., for iris scan, voice signatures, or fingerprints), voice recognition, and flash cards. Some or all of the communications are preferably over wireless links (though not required).

The token device 200 may also implement various security measures such as authentication and data encryption/decryption. The processor 204 may be configured to self-authenticate and to authenticate another party in communication. The processor 204 may also be configured to run cryptographic algorithms, and the storage device 202 may record one or more crypto keys and/or other security parameters. The storage device 202 may hold data related to the financial instrument, some or all of which information may be encrypted. The data may include, for example, issuer information, ownership information or chain of title, fiduciary requirements associated with the instrument, and financial parameters (e.g., valuation, expiry, account association, tax-prepayment, and transaction rules). According to some embodiments of the present invention, the token device 200 may provide multi-level access control which permits a non-secure, general access to non-confidential information of the financial instrument but only allows trusted users or devices to access confidential information.

The token device 200 may preferably have self-awareness as well as awareness of its computing environment. That is, the token device 200 may constantly keep track of a status of the associated financial instrument, and may maintain or obtain accurate time, date, and network location information.

Figure 3:
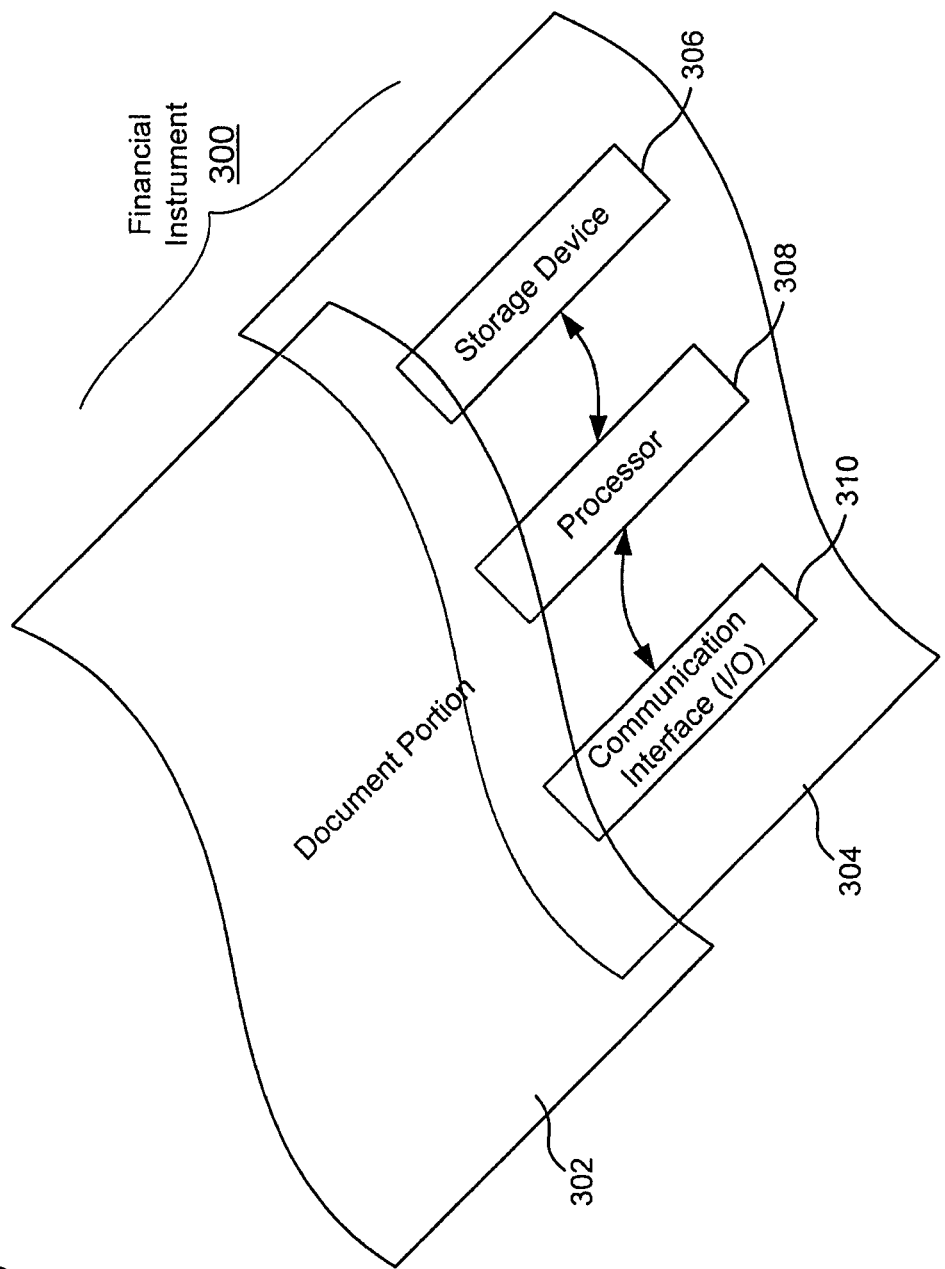
FIG. 3 shows a block diagram illustrating yet another exemplary financial instrument in accordance with an embodiment of the present invention.

FIG. 3 shows a block diagram illustrating another exemplary financial instrument 300 in accordance with an embodiment of the present invention. The financial instrument 300 may also comprise two portions, a document portion 302 and a token portion 304. The token portion may comprise a storage device 306, a processor 308, and a communication interface 310 which may be integrated or laid out on a flexible substrate 30. The flexible substrate 30 may be of a same size as the document portion 302. Therefore, the document portion 302 and the token portion 304 may be overlaid on top of each other. The components (306, 308, and 310) in the token portion 304 may be hidden from plain view, and the financial instrument 300 may have the same look and feel as a traditional paper-based financial instrument.

Figure 4:
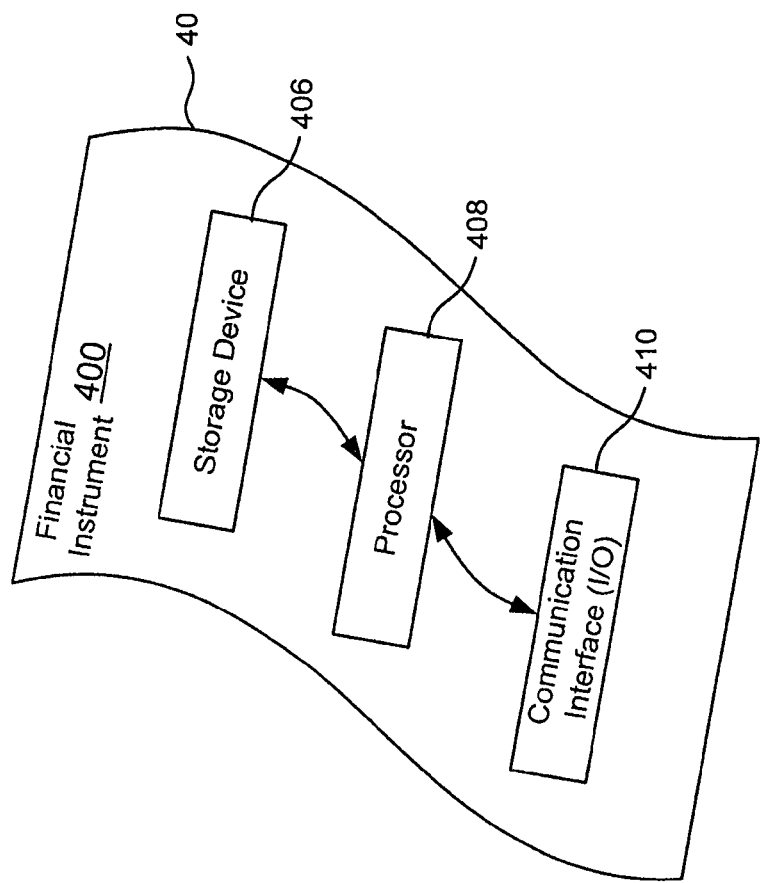
FIG. 4 shows a block diagram illustrating an exemplary token device in accordance with an embodiment of the present invention.

FIG. 4 shows a block diagram illustrating yet another exemplary financial instrument 400 in accordance with an embodiment of the present invention. In this embodiment, the financial instrument 400 is itself a token device having a storage device 406, a processor 408, and a communication interface 410 on a flexible substrate 40. The financial instrument 400 may not include a document portion, or, alternatively, the document portion may have its information recorded in the storage device 406. That is, a token device may by itself serve as a physical representation of a financial instrument.

According to some embodiments of the present invention, the financial instrument 400 may be a plastic payment card, such as a debit card, a credit card, or a stored value card, with a physical token embedded therein or with a logical token encoded in the card's storage medium (e.g., magnetic stripe). When the payment card is used in a transaction (e.g., card purchase or cash advance/withdrawal), the embedded or encoded token may operate to include the token information into transaction data. The transaction data may also have embedded therein or appended thereto a new token that is generated based on the token information from the payment card. The IP address or content of the new token may indicate that the transaction was initiated with this particular payment card. So, the new token (considered a child of the token in the payment card) may be used to trace the processing of the transaction and may further spawn additional new tokens during the processing.

Figure 5:
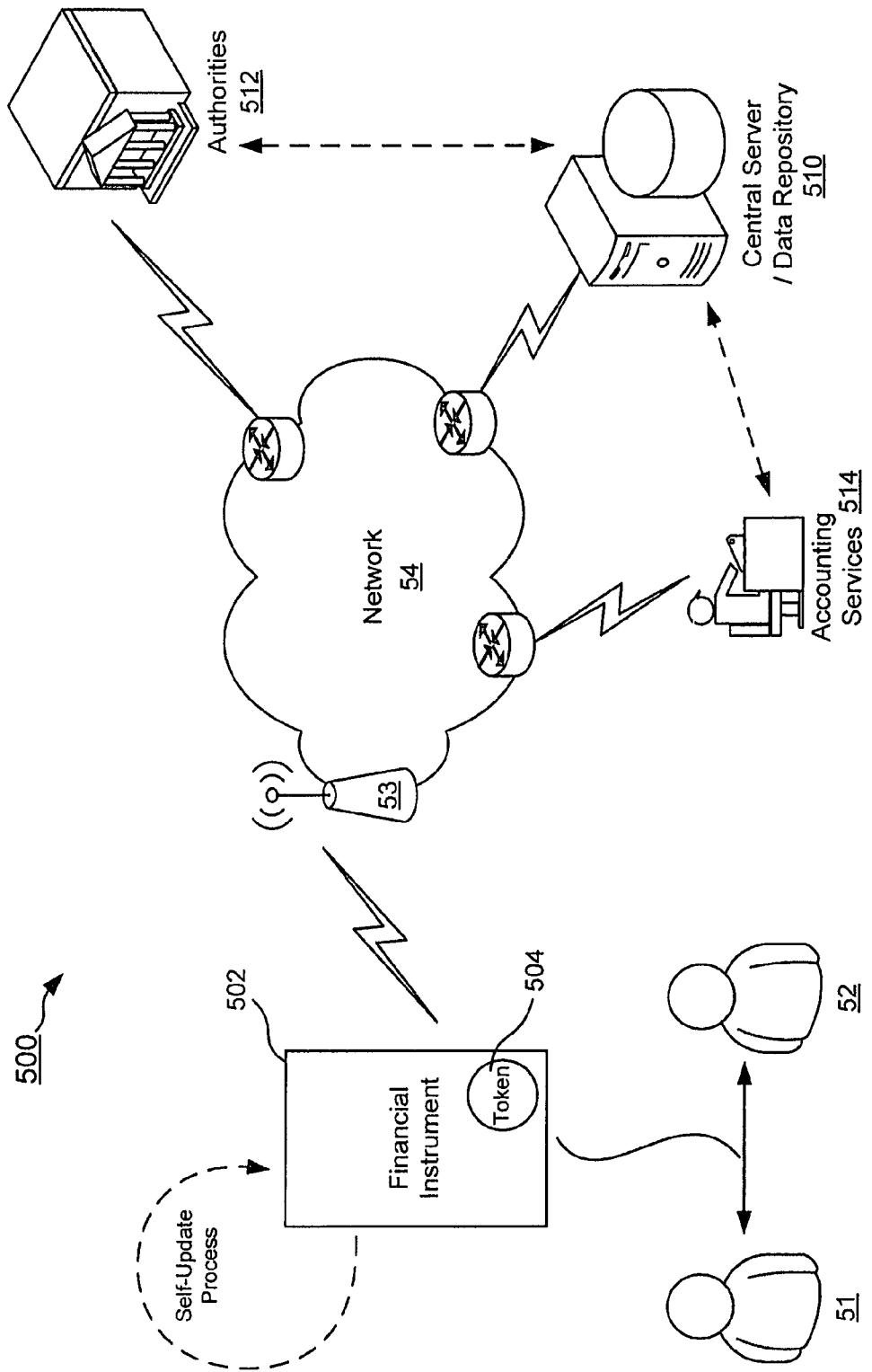
FIG. 5 shows a block diagram illustrating an exemplary system for circulating smart financial instruments in accordance with embodiments of the present invention.

FIG. 5 shows a block diagram illustrating an exemplary system 500 for circulating smart financial instruments in accordance with embodiments of the present invention. The system 500 provides an overview of some exemplary functions of a smart financial instrument 502. The financial instrument 502 may comprise or be affixed with a token 504 which provides one or more smart features.

The financial instrument 502 may be circulated among a number of entities who may buy, sell, exchange, borrow, or borrow against the financial instrument 502, or otherwise engage in any kind of transactions using or involving the financial instrument 502. For clarity, only two entities (51 and 52) are shown in FIG. 5, although the transaction is not limited to a two-party deal and may involve any number of participants. The transaction may generally change one or more characteristics of the financial instrument 502, such as ownership, value and/or transferability. The change may be automatically recorded in or by the token 504 in a self-update process. The token 504 may acquire the updated information through assistance of at least one party in the transaction. For example, it may be stipulated that any transaction affecting a status of the financial instrument 502 will be incomplete or invalid unless and until data recorded in the associated token 504 are updated to reflect the changed status. Therefore, it may be required that at least one party provide requisite information, such as time and location of the transaction, price paid, and new owner identification, to update data records in the token 504 or to allow the token 504 to self-update based on such inputs. The parties (51, 52) may also use reader/writer devices and follow a predetermined procedure to update the token 504 or to trigger its self-update process.

In addition to or as an alternative to updating data records of the token 504, the changed status of the financial instrument 502 may be reported to at least one remote entity in a real-time or delayed transmission. As soon as a transaction takes place or shortly thereafter, the token 504 may acquire information related to the transaction and initiate a communication with one or more remote entities to report the information. Alternatively, the token 504 may perform precursory communication functions (e.g., data acquisition and/or reporting) prior to or concurrently with the transaction. The communication may be via a wireless access point 53 and may traverse a network 54. The remote entities may include a central server and/or data repository 510, government authorities 512, and accounting services 514. The central server 510 is typically maintained by or for an issuer of the financial instrument 502. The central server 510 may also be associated with a market facilitator such as an exchange or a trading platform. The government authorities may include one or more taxation agencies, trade and securities regulators, or law enforcement. The accounting services 514 may include one or more independent accounting or auditing service providers, or similar service providers associated with the issuer of the financial instrument or parties in the transaction. According to one embodiment of the present invention, the central server 510 may serve as a sole point of contact for the token 504 by receiving its data reports and sharing the data with the authorities 512 and the accounting services 514.

Through the above-described self-update and/or self-reporting procedures, a current status of the financial instrument 502, such as location and ownership, may be continuously tracked. Many benefits may flow from the tracking of financial instruments and the related transactions. For example, tax evasion, money laundering, and other illegal or suspicious activities may be deterred or detected. Theft of a smart financial instrument may be deterred since mere physical possession of the financial instrument is not enough to convey ownership. The token device in a smart financial instrument may contain security data for authentication and authorization purposes. Unauthorized possession or alternation of a smart financial instrument may be detected based on an examination of an associated token or a central data record. Accounting and taxation of monetary transactions may be automated based on information collected through smart financial instruments.

Additional watchdog controls may be flexibly implemented on smart financial instruments to ensure that transactions conform with contractual and/or statutory rules and restrictions. For instance, the smart financial instruments may facilitate monitoring of transactions in which fiduciary duties are involved or which require third-party authorization. For example, a trustee or similar agent may act on behalf of or jointly with a minor, a senior, or a person with diminished capacity to execute transactions involving smart financial instruments. Those financial instruments may be programmed to indicate the fiduciary situation and impose additional criteria for the transactions to be cleared. For example, such financial instruments may not be permitted to traded if the price is more than 10% less than market value. For another example, a proposed transaction that exceeds a threshold amount may require approval of a third party (e.g., a judge or arbitrator). The smart financial instruments may be trusted to faithfully apply those rules, based on real-time or non-real-time information acquired, to safeguard the interests of the fiduciary owner(s) of the instruments. The smart financial instruments may further cause a receipt or similar documents to be generated, which documents may be traceable with their own token devices. Moreover, the fiduciary duty can be performed in real-time and remotely from the locus of the financial instrument and related transactions.

Figure 6:
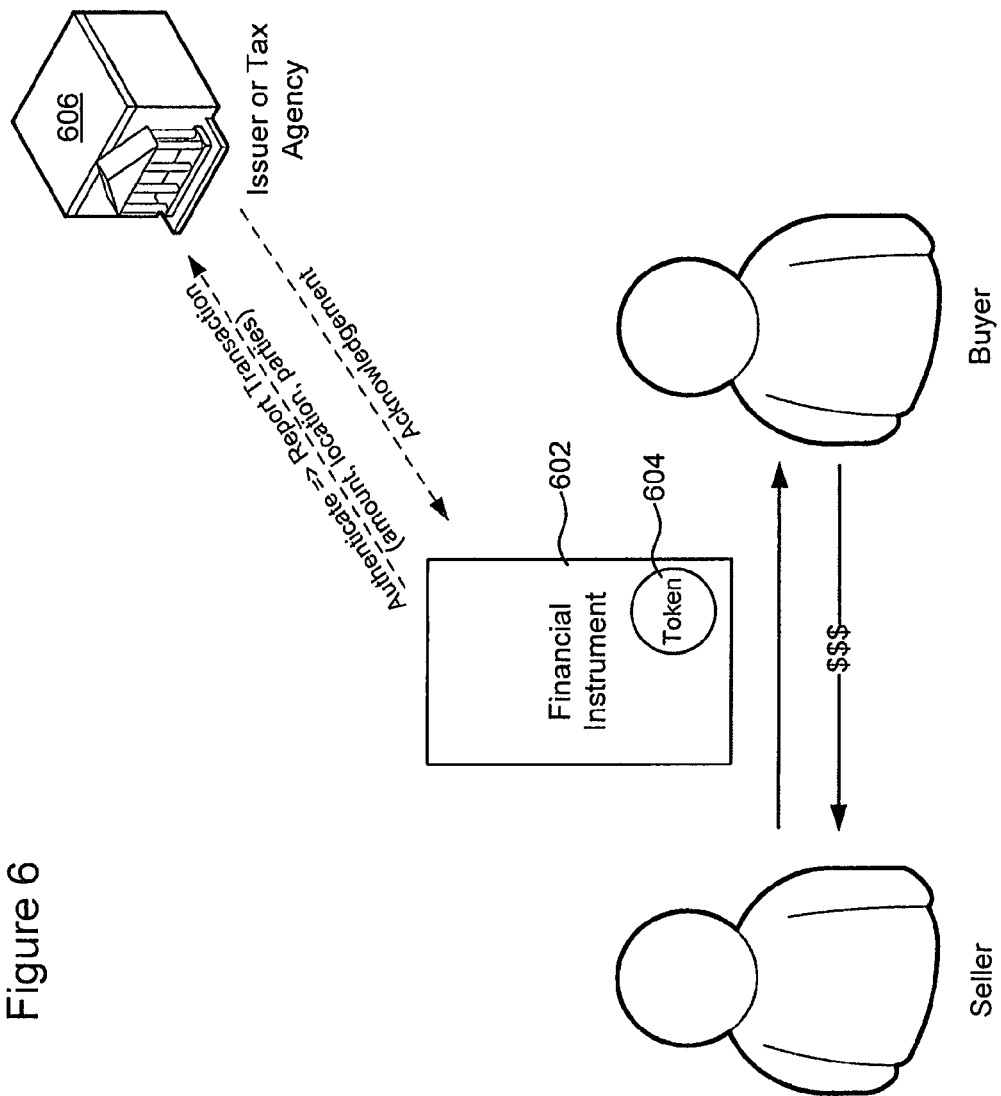
FIG. 6 shows a block diagram illustrating another exemplary transaction involving a smart financial instrument in accordance with an embodiment of the present invention.

FIG. 6 shows a block diagram illustrating another exemplary transaction involving a smart financial instrument 602 in accordance with an embodiment of the present invention. The smart financial instrument 602 may be associated with a token 604 having one or more of the functions as described above.

The financial instrument 602 may be involved in a private transaction between a buyer and a seller. The seller may transfer the financial instrument 602 to the buyer in return for cash. In order to prevent tax evasion or other illegal activities, it may be required that the financial instrument 602 facilitate a three-way handshake among the buyer, the seller and a remote host 606, wherein the remote host 606 may be associated with an issuer of the financial instrument 602 or a tax agency. Before the transaction can finalize, the token 604 may initiate a communication with the remote host 606. The token 604 may be first authenticated to the remote host 606 and then report key information about the transaction.

For example, the token 604 may report the identity of the buyer and the seller, time and location (jurisdiction) of the transaction, the nature of the transaction, and price paid. For taxation purposes, the token 604 may have recorded information on a prior sale of the financial instrument 602, such as when the seller acquired it and at what price. Based on the additional information, it may be immediately determined whether the seller realized a gain or loss and whether to categorize the gain/loss as long-term or short-term. The amount of income tax owed as a result of the sale may be estimated for the seller as well. Upon receiving the report of the transaction from the token 604, the remote host 606 may return a simple acknowledgement message (e.g., with a unique string of text or symbols) or may include the tax assessment in the acknowledgement message. According to some embodiments of the present invention, the computed tax assessment(s) may be immediately deducted from the current value of the financial instrument 602 and paid to the appropriate jurisdiction(s). The token 604 may update its records with the transaction information and the acknowledgement message from the remote host 606, thus finalizing the transaction between the buyer and the seller.

The implementation of smart financial instruments like the financial instrument 602 may greatly simplify taxation processes and related monitoring and auditing needs, especially for securities that are frequently traded or exchanged among multiple owners. The self-reporting and self-updating functions of token devices (604) may ensure an accurate accounting of taxable transactions. In fact, prepayment or instant payment of relevant taxes may be facilitated with the smart financial instruments (602). An entity that puts these smart financial instruments into circulation and/or administrates reporting/accounting functions associated therewith may be able to receive a favorable tax treatment (e.g., reduced tax rate and exemption from further reporting) in return for the efficiency and automated compliance introduced with the token devices.

According to one embodiment of the present invention, the reporting of the transaction may be delayed until sometime after the transaction. However, until the reporting is completed and the token 604 is updated with an acknowledgement message from the remote host 606, the buyer (new owner) may not be able to transfer the financial instrument 602 to another entity.

Figure 7:
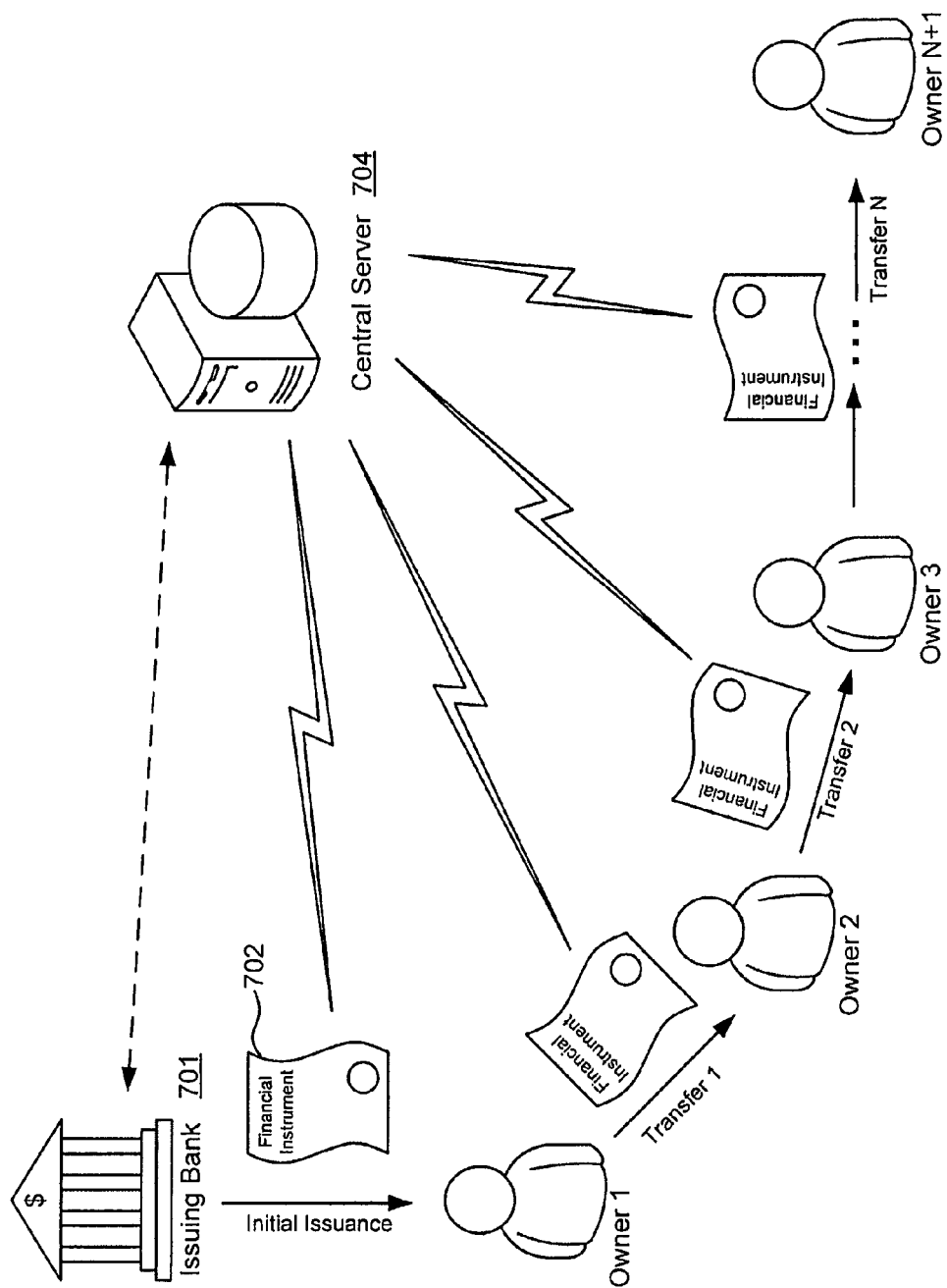
FIG. 7 shows a block diagram illustrating an exemplary method for tracing transfers and ownership of a financial instrument in accordance with an embodiment of the present invention.

FIG. 7 shows a block diagram illustrating an exemplary method for tracing transfers and ownership of a smart financial instrument 702 in accordance with an embodiment of the present invention. The smart financial instrument 702 may be created and issued by an issuing bank 701, and then be transferred multiple times from Owner 1, to Owner 2, Owner 3, . . . and Owner N+1. Each time the a transfer occurs, the smart financial instrument 702 may report the transaction to a central server 704. The central server 704 may be managed by or for the issuing bank 701 and may acquire information on the smart financial instrument 702 before or upon its issuance. As the smart financial instrument 702 gets passed on from one owner to another, a history of ownership may be recorded in the central server 704 and/or the smart financial instrument 702. Any defect in legal title or irregularity in the transactions may be quickly traced to its origin. In partial transfers, conditional transfers or mortgage transactions, encumbrances on the financial instrument 702, such as security interests and creditor priorities, may be recorded by the smart financial instrument 702 or the central server 704. The recorded encumbrances may be translated into restrictions on the financial instrument 702 which can be automatically enforced in subsequent transactions. For example, when a sale of the financial instrument 702 is attempted which might affect a lien-holder's security interest, the sale may be blocked or at least temporarily suspended until the lien-holder is notified and gives permission.

According to some embodiments of the present invention, the chain of transfers may also be traced with virtual tokens. For example, the financial instruments 702 shown in FIG. 7 may each be a virtual financial instrument or a unit of transaction data associated with a physical or virtual financial instrument (e.g., a payment card). According to one embodiment of the present invention, Issuing Bank 701 may initially issue a payment card 702 with an embedded token device. Owner 1 may then conduct a transaction with Owner 2, such as a purchase transaction (e.g., the payment card being a credit card), a cash withdrawal (e.g., the payment being a debit card), or a gift transaction (e.g., the payment card being a stored value card). The transaction may either cause the token in the payment card 702 to be updated or cause new tokens to be generated for the transaction data. For instance, in a purchase transaction initiated at Owner 1, a retailer, an authorization request may be transmitted to Owner 2, a card processing system. The authorization request may include both the transaction data and a new virtual token generated based on the transaction and the token in the payment card 702. The new virtual token may be updated and may perform reporting functions in the authorization process and/or subsequent settlement processes. Additional new virtual tokens may also be generated in the subsequent settlement or other processes as needed. In other words, the tracing and reporting of the financial instrument 702 and its related transactions may be accomplished with the token device in the financial instrument 702 as well as new tokens spawned from that original token.

Figure 8:
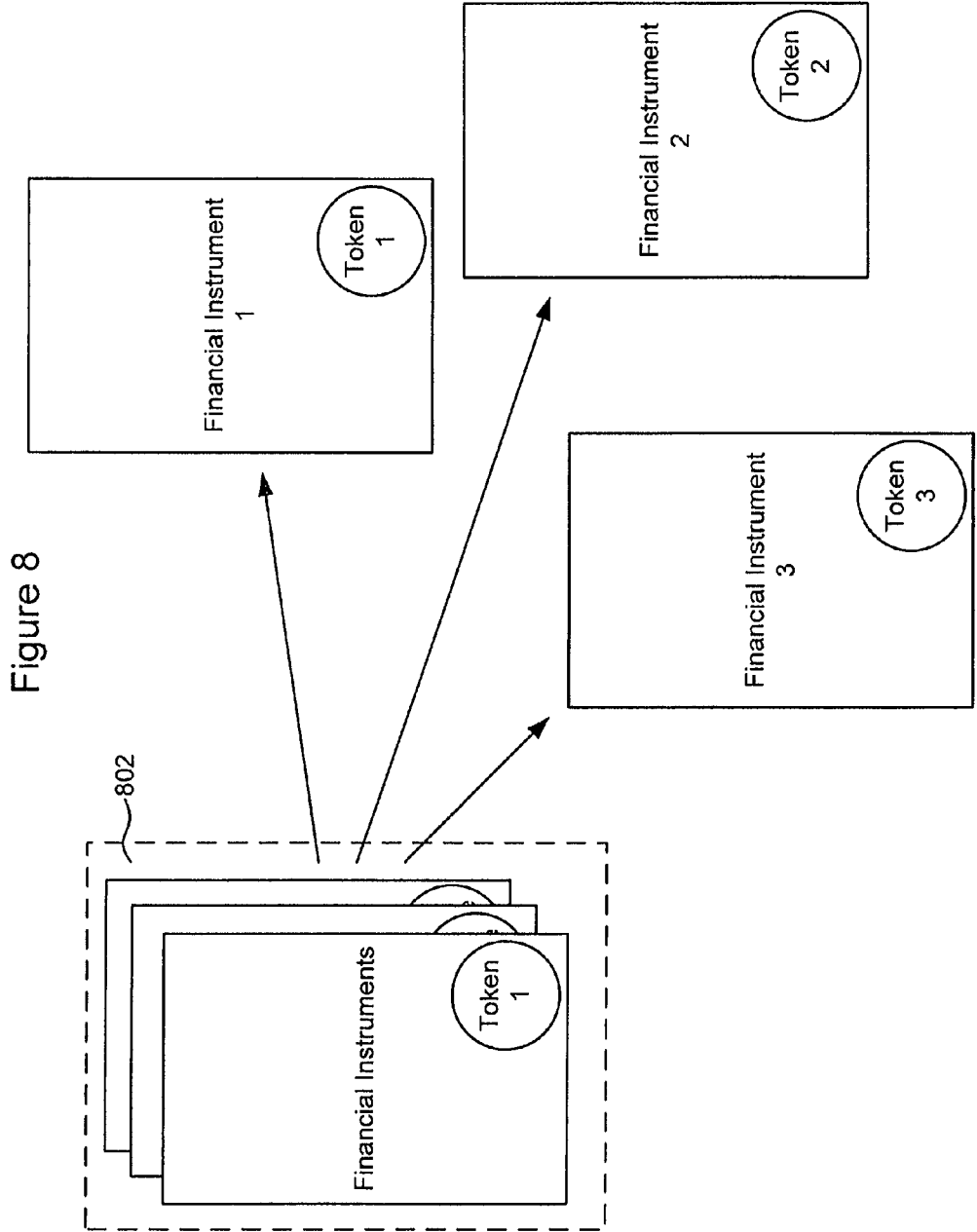
FIG. 8 shows a block diagram illustrating an exemplary method for splitting a unit of financial instruments in accordance with an embodiment of the present invention.

FIG. 8 shows a block diagram illustrating an exemplary method for splitting a unit of financial instruments in accordance with an embodiment of the present invention. As mentioned above, a token device may be associated with a unit of either a single financial instrument or multiple financial instruments. As shown in FIG. 8, a group (802) of financial instruments may include three financial instruments (Financial Instrument 1, Financial Instrument 2, and Financial Instrument 3) having associated tokens (Token 1, Token 2, and Token 3 respectively). In the initial unit 802, only Token 1 may be assigned a unique IP address and coded with information of the entire unit 802. Token 2 and Token 3 may be simply uncoded. In a three-way split transaction of the unit 802, Financial Instrument 1, Financial Instrument 2, and Financial Instrument 3 may each become a valid and individually transferable financial instrument.

To effectuate the split transaction, new IP addresses may be assigned to Token 1, Token 2, and Token 3 respectively, based on the original IP address of the unit 802 (i.e., Token 1). The new IP addresses of the tokens may be or include subnet addresses based on the original IP address of the unit 802, thereby reflecting the fact that Financial Instrument 1, Financial Instrument 2, and Financial Instrument 3 are the result of splitting the unit 802. New information may be recorded in Token 1, Token 2, and Token 3 to reflect their respective financial parameters etc. The assignment of new IP (subnet) addresses and the data updates for the tokens may be achieved through peer-to-peer communications among the tokens or via an intermediate device or server.

It should be noted that the split transaction may also be implemented with virtual or logical tokens. As mentioned above, a virtual or logical token may represent or be associated with either a virtual financial instrument or a unit of transaction data related to one or more financial instruments. For example, the initial unit 802 as shown in FIG. 8 may be a debit or credit transaction related to a payment card. The debit or credit transaction may be split up and applied to three different accounts associated with the payment card. For instance, the payment card may have been linked to a demand deposit account (DDA) (shown as Financial Instrument 1), a credit account (shown as Financial Instrument 2), and a money market account (shown as Financial Instrument 3). The holder of the payment card might decide to fund portions of a purchase with funds from some or all of the three accounts. As that purchase transaction is split among the three accounts, new tokens 1-3 may be generated to reflect the origin of those charges.

Figure 9:
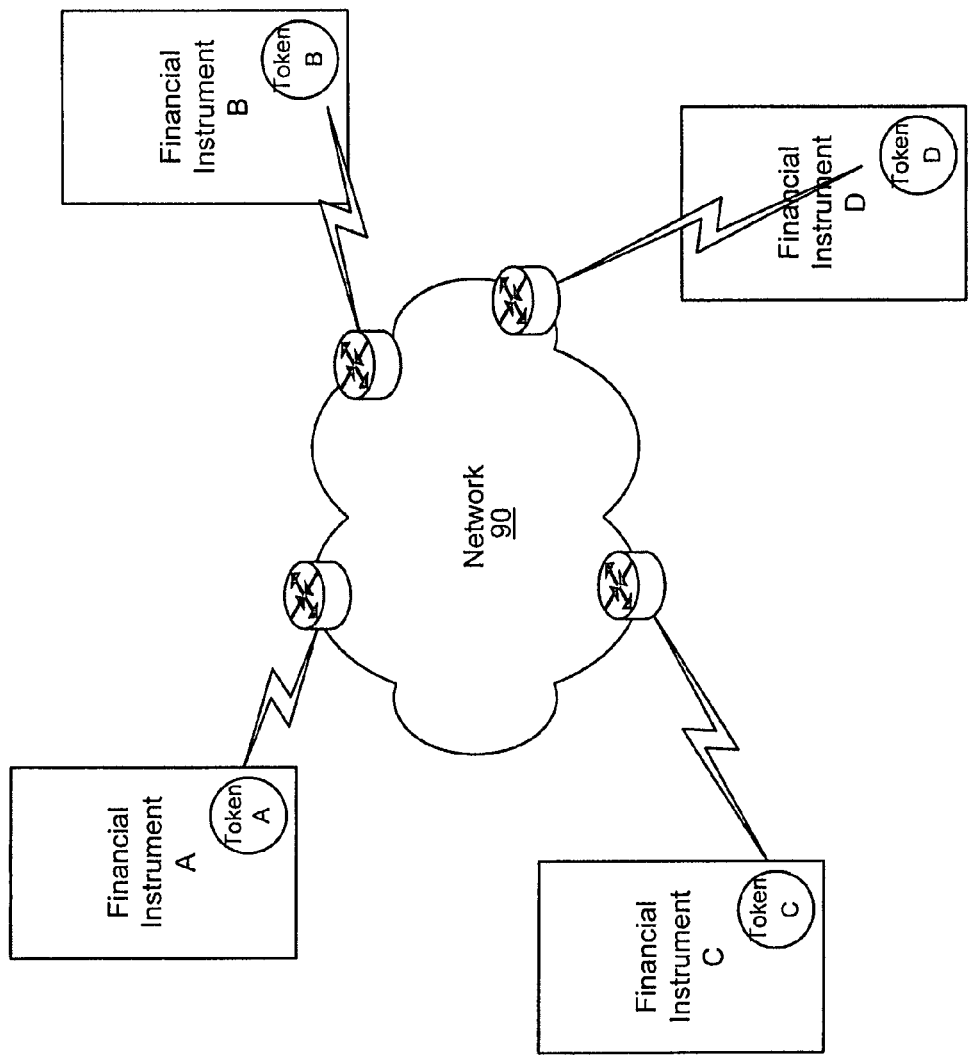
FIG. 9 shows a block diagram illustrating peer-to-peer communications among smart financial instruments in accordance with an embodiment of the present invention.

FIG. 9 shows a block diagram illustrating peer-to-peer communications among smart financial instruments in accordance with an embodiment of the present invention. Financial Instruments A-D may each include a token device (i.e., Tokens A-D, respectively). Through a network 90, which may be wired or wireless or a combination thereof, any two of the Financial Instruments A-D may communicate directly with each other without any intermediate device or server. This peer-to-peer communications, which tend to be faster, less complex than centralized client-host communications, may enable a variety of new services for the financial instruments. For example, interactions among smart financial instruments may help form a local, regional, or even global market. Smart financial instruments may directly negotiate and complete trades with one another. Pricing information (e.g., bid/ask) may be propagated among financial instruments through peer-to-peer broadcasting.

According to one embodiment of the present invention, a fair trading scheme may be facilitated with the grid computing among a plurality of smart financial instruments. For example, a group or a class of smart financial instruments may participate in a public auction, wherein pricing information is broadcast or relayed in a peer-to-peer fashion among the smart financial instruments. To ensure fairness in the bidding process, a time window may be implemented to accept bids from the smart financial instruments which might be scattered all over the world (e.g., in a loosely connected global network). All the smart financial instruments may have access to a trusted network of time servers or a central clock to receive a common timing reference. The time window may be set wide enough to ensure that the pricing information has traveled to far corners of the global network and all participating financial instruments have had a chance to receive and respond to the pricing information. This mechanism may prevent those financial instruments situated in physical proximity to the source of the pricing information from gaining an unfair advantage over those remotely situated financial instruments. Bids received within the time window may be treated as arriving at the same time. In addition, a randomizing mechanism may be implemented to prevent the auction decisions from being biased or otherwise affected by geographic factors.

Thus, the embodiment illustrated in FIG. 9 may enable or facilitate a new form of market, such as a stock market. Unlike current stock exchanges or auction-sites such as eBay, there need not be account-based securities and central services to administrate pricing, to provide bid-ask support, or to clear trades. The intelligence, stored data, security measures, communication capabilities, timers, and compliance rules in the smart financial instruments described above may provide the reporting, taxation, and fairness required for market establishment and participation, whether for a local, regional, or global market.

Regarding FIG. 9, and referring again to FIG. 8 and unit 802, the IP and IP subnet addressing methodology described in connection with FIG. 8 can be employed to facilitate participation by smart financial instruments within the "peer-to-peer stock market" exemplified in FIG. 9. Hitherto, stock markets have operated in a "client-server" model architecture in which central servers provide such services as pricing, trade clearing, and regulatory compliance. In order for the new smart financial instruments described herein to interact with each other directly (locally and/or remotely) and in large numbers in a "peer-to-peer" configuration and partially or completely independent of a "client-server" model, it may be desirable for these instruments to locate the specific instruments with which they wish to interact. This interaction can be facilitated by using the IP address (and associated IP subnets) to identify not only where in the network a smart financial instrument is located, but also what type of instrument it represents, and/or the status of the instrument. For example, while the variable portion of the IP address provides for ability to locate the financial instrument even as its location changes, the fixed portion, in a manner similar to the Dewey Decimal System, can be set up by the issuer of the security in such a way as to identify the specific type of financial instrument it is. Manipulation of either portion of the address can be used to indicate status of the security (such as whether it is for sale, whether it wishes to buy, or whether it wishes not to be disturbed). More details are provided below in connection with FIG. 11 on encoding and identifying the type and status of a smart financial instrument with its IP address. In this manner, efficiently targeted broadcasts or unicasts will be enabled so that appropriate peer-partner groups can locate each other and communicate rapidly and without the expense, delay, and overhead of a central server and without the potentially massive overhead of every instrument needing to communicate with all other instruments. According to some embodiments, a central server may still play a limited role, as necessary, in the predominantly peer-to-peer communications among smart financial instruments.

The peer-to-peer communications among smart financial instruments, as well as the self-reporting functionality of individual financial instruments, may be particularly beneficial to the issuing and trading of financial derivatives. A financial derivative is a financial instrument whose value is derived from the value of something else (e.g., other underlying financial instruments). One example of financial derivatives may be a call option which is issued in reference to an underlying stock. The price/value of the call option depends on how likely the underlying stock price will move above or below a specified strike price before the call option expires. According to embodiments of the present invention, the value dependency between a financial derivative and the underlying financial instrument(s) referenced may reflected and enforced with smart financial instruments. For example, at least the financial derivative may be a (first) smart financial instrument which records, among other things, its relationship to an underlying financial instrument which may or may not be implemented as a second smart financial instrument. Through peer-to-peer communications or via a central server (or other sources), the first smart financial instrument (i.e., the financial derivative) may be updated with the changes in price of the second smart financial instrument (i.e., the underlying) or other relevant information. With the updated information, the first smart financial instrument may then determine its own status (current value, expiration) based on the recorded relationship (typically implemented as rules or algorithms). The first smart financial instrument may also make a decision as to what actions to take based on its current status and/or the updated information of the underlying. For example, the first smart financial instrument may be a call option, and it may automatically cause the option to be exercised once it learns that the underlying stock price has exceeded a predetermined level. In other words, with smart tokens, financial derivatives may detect changes or movements in the underlying instruments and change themselves or otherwise react accordingly.

Figure 10:
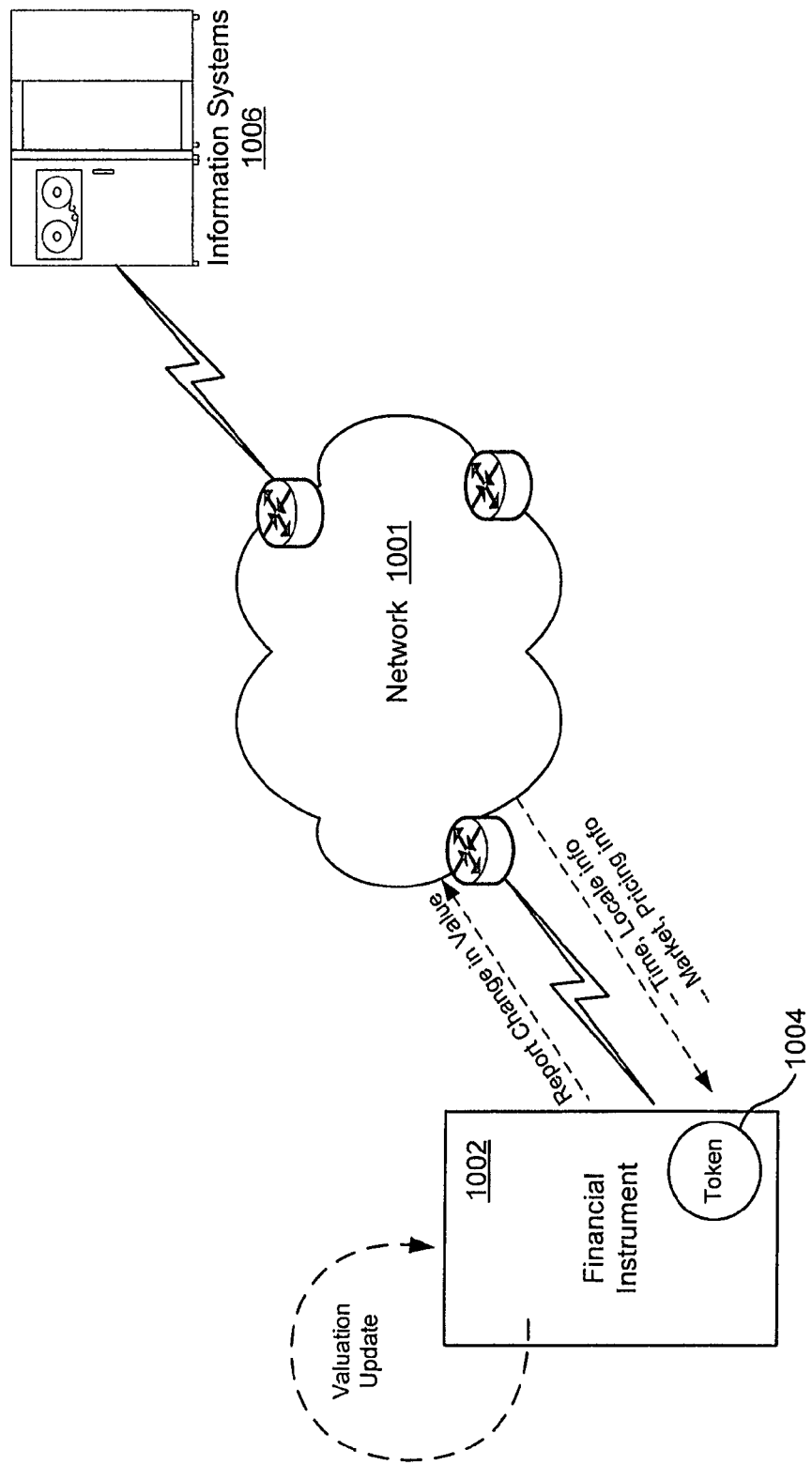
FIG. 10 shows a block diagram illustrating self-valuation of a smart financial instrument in accordance with an embodiment of the present invention.

FIG. 10 shows a block diagram illustrating self-valuation of a smart financial instrument 1002 in accordance with an embodiment of the present invention. The smart financial instrument 1002 may include or be associated with a token 1004. The financial instrument 1002 may have a variable value that fluctuates with one or more external conditions. For example, the financial instrument 1002 may be a stock certificate or a treasury bond whose price changes with current market conditions (e.g., bid/ask, interest rates). Or, the financial instrument 1002 may be an option contract whose value changes with current pricing of the underlying assets as well as the remaining contract term. Periodically or upon triggering events, the token 1004 may connect to a network 1001 to retrieve updated time/date and location information. The token 1004 may also initiate a query to one or more remote information systems 1006 to receive current market or pricing information. Alternatively, the market or pricing information may be contained in a broadcast data stream from which the token 1004 may retrieve data as needed. Then, based on the information updates, the token 1004 may calculate and/or update a current value of the financial instrument 1002.

According to one embodiment of the present invention, some or all financial assets of a particular owner may be placed in a virtual wallet with smart features. The virtual wallet may be implemented with the token technology described above. In a preferred embodiment, the virtual wallet may be self-aware and may participate in a market grid and communicate with its owner or a designated fiduciary party. The virtual wallet may be programmed to understand its current state and its desired state (based on temporal conditions or market conditions). It may recognize changes to its current state based upon fluctuating market conditions and may either notify the owner or fiduciaries or take action on its own as may be permitted to alter its current state through one or more trades. An issuer of the virtual wallet could enter into any of a variety of relationships with the owner of the virtual wallet including obtaining fees for proprietary analytic software, supplying hedging guarantees, and so on, while the owner may receive the benefits of portfolio management plus security against theft and fraud.

Figure 11:
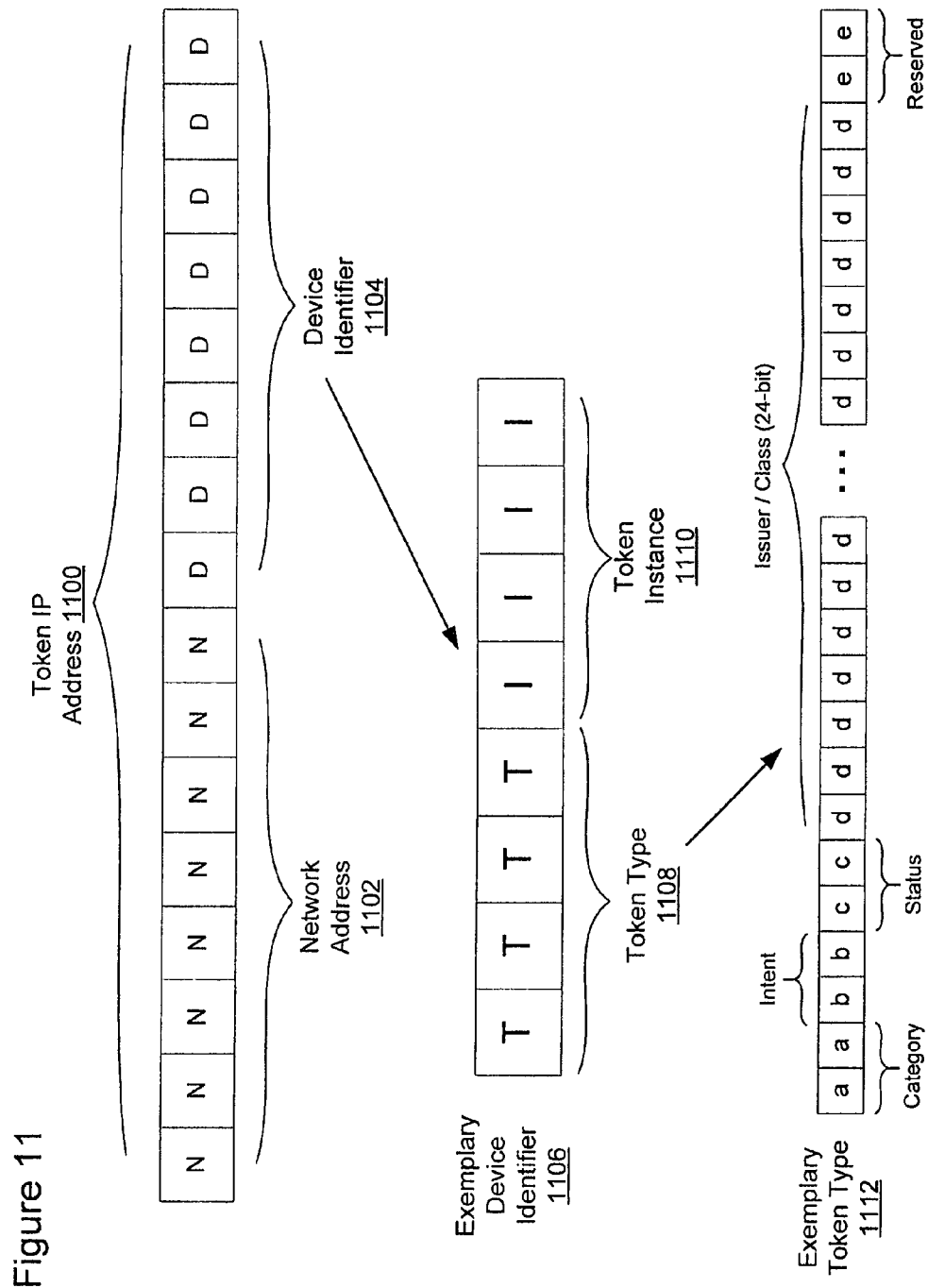
FIG. 11 shows an exemplary use of IP address and IP subnet masking for smart financial instruments in accordance with an embodiment of the present invention.

FIG. 11 shows an exemplary use of IP address and IP subnet masking for smart financial instruments in accordance with an embodiment of the present invention. There is shown an IP address 1100 that may be assigned to a token device (not shown) which is attached to or embedded in a smart financial instrument (not shown). The IP address 1100 may be a 128-bit (or 16-byte) binary number, with two logical portions: an 8-byte network address 1102 (also referred to as "network prefix") and an 8-byte device identifier 1104 (also referred to as "host address"). The network address 1102 may dynamically change with the physical or network location of the token device. The device identifier 1104 may be relatively fixed except for some variable bits which indicate a current intent and/or status as related to trading or other transactions.

In FIG. 11, an exemplary format of the device identifier 1104 is illustrated with an exemplary device identifier 1106. With this exemplary format, four bytes ("T T T T") in the 8-byte device identifier 1106 may indicate a token type 1108, and the remaining four bytes ("I I I I") may indicate a token instance 1110. The 4-byte (or 32-bit) token instance 1110 may uniquely identify a particular instance of a financial instrument from among a maximum of $2^{32}$=4,294,967,296 (approximately 4.3 billion) different instances.

The 4-byte token type 1108 may have an exemplary format as shown in the 32-bit binary string labeled "exemplary token type 1112."

The first two bits ("aa") in the exemplary token type 1112 may indicate one of four possible categories to which the financial instrument might belong, such as stock ("11"), bond ("10"), commodity ("01") and other (e.g., mixed basket of securities, derivatives, etc.) ("00").

The next two bits ("bb") in the exemplary token type 1112 may indicate an intent of a holder of the financial instrument with respect to potential trading and a capacity of the financial instrument to participate in potential trading. For example, the holder's intent may be encoded into the "bb" bits according to Table 1.

TABLE 1

| "bb" Encoding | Meaning |
| --- | --- |
| 11 | willing to sell and willing to buy (instrument has stock to sell and cash to buy) |
| 10 | willing to sell, not willing to buy (instrument has stock to sell, may or may not have cash but is not buying at this time) |
| 01 | not willing to sell, willing to buy (instrument may or may not have stock, has cash and wants to buy stock) |
| 00 | not willing to sell, not willing to buy (instrument is dormant) |

The next two bits ("cc") in the exemplary token type 1112 may indicate a current status of a transaction involving the financial instrument. For example, the trading status of the financial instrument may be encoded into the "cc" bits according to Table 2.

TABLE 2

| "cc" Encoding | Meaning |
| --- | --- |
| 11 | bid to purchase pending and bid to sell pending |
| 10 | bid to purchase pending and no bid to sell pending |
| 01 | no bid to purchase pending and bid to sell pending |
| 00 | no bid to purchase tendered and no bid to sell pending |

In the fair trading period based on network clocking, bid intervals, and randomized acceptance, the "cc" field status indicator may allow control of the time periods during which smart financial instruments have sent or received bids and are awaiting final determination of winners and losers. The status indicator enables an orderly processing and control of situations where more than one bid has been sent or received and multiple responses must be handled up to the point that an offer is accepted or parties have discontinued their participation in that particular buy/sell competition process. Control may be imposed by the fact that the status indicators work together with the fair trading interval and randomized acceptance to provide order. For example, if security A sends an offer to purchase to securities B and C, if both respond affirmatively, security A will use its randomizer to selectively confirm either B or C (and notify both the winner and loser) and then complete the transaction. The "cc" status indicator field may control the state of bidders and bid recipients until completion of a sale. In a more complex case, where, for example, 30 bidders send offers to 40 sellers, each seller may respond to each bidder announcing whether they are the winner (according to their randomized selection process). If the winning offer is unique (bidder receives exactly one offer), then the sale proceeds. If a bidder receives more than one winning offer, it selects which seller to purchase from by means of its randomizing algorithm. An instrument may be programmed to cease participation (change its status to "not buying" or "not selling") after a predetermined number of such "multi-win" turnarounds has occurred, in order to prevent looping or other extended duration or deadly embace-type situations.

It will also be appreciated that additional means of controlling the "offer-accept" process are envisioned. For example; when a plurality of sellers and a plurality of buyers interact with one another, a buying financial instrument might receive multiple acceptances from multiple selling financial instruments respectively. As a result, a selling financial instrument's first-choice buyer (selected based on random selection) may not accept its offer. Since an offer to buy may be accepted by more than one seller, a buyer may receive several acceptances. In such a case, its random selection function will select one of the accepting sellers, and will confirm with that seller and send offer rejections to all other sellers that accepted the offer. While the process could terminate and start over again at this point, it may be preferable, for the sake of efficiency, not to end the process in this way. Rather, the buyer may continue responding to those sellers (who responded to the initial offer to buy) with a prioritization indication generated as part of the randomized acceptance process. One such example is described as follows. If Seller A (i.e., a selling financial instrument) receives 100 offers to buy, it may respond with 97 rejections, one acceptance to Buyer X, one response labeled "2nd choice acceptance" to Buyer Y, and one response labeled "third-place acceptance" to Buyer Z. If Buyer X receives more than one such winning response to its broadcasted offer to buy, its randomizing acceptance might select a seller other than Seller A, in which case X will reject A's offer. If Buyer Y has sent a "continuation" acceptance to Seller A, Buyer Y would then become the winner. Many such prioritization schemes will be possible, and the example serves to illustrate a general concept of a market governed by time slot windows, with smart financial instruments traded within those windows, and for example, with random selection of winners and priority selection of alternates, with defined status conditions controlling interaction of the financial instruments, and/or with conditional offer and acceptance methods that provide fairness and order for markets that span regions, the entire globe or even beyond.

Referring again to the exemplary token type 1112 in FIG. 11, a 24-bit field ("ddd . . . d") may be used to identify an issuer and/or an asset class of the financial instrument. For example, "111111111111111111111111" may indicate that the financial instrument is a "General Electric Company's common stock," "111111111111111111111110" may indicate that the financial instrument is a "General Electric Company's preferred stock," "111111111111111111111101" may indicate that the financial instrument is an "Exxon-Mobil Corporation's common stock," and so forth. Altogether, the 24-bit "ddd . . . d" field may uniquely identify a total of $2^{24}$=16,777,216 (or approximately 16.7 million) issuer-class combinations.

The exemplary token type 1112 may further include two reserved bits ("ee") which may be used for any other purposes such as added security, more detailed description of instrument status, or as a pointer to the location in storage device 202 of additional information about the financial instrument.

With the exemplary token type 1112 as described above, exemplary encoding of the token type 1108 field, as listed in Table 3, may be decoded to have the corresponding meanings. (Note "XX" indicates "do not care" since the last two "cc" bits are reserved.)

TABLE 3

| "T T T T" Encoding | Meaning |
|---|---|
| 11 11 001111111111111111111111101 XX | willing to sell and willing to buy (instrument has Exxon common stock to sell and cash to buy) |
| 11 10 001111111111111111111111101 XX | willing to sell but not willing to buy (instrument has Exxon common stock to sell, may or may not have cash but is not buying at this time) |
| 11 01 001111111111111111111111101 XX | not willing to sell, willing to buy (instrument may or may not have Exxon common stock, has cash and wants to buy Exxon common stock) |
| 11 00 001111111111111111111111101 XX | not willing to sell, not willing to buy (instrument is interested in Exxon matters but is dormant with regard to selling or purchasing) |
| 11 00 101111111111111111111111101 XX | not willing to sell, offer to purchase is outstanding (instrument is attempting to purchase Exxon common stock and has sent out bid(s) and is in process of determining which, if any, sale offers to accept. |

In the case of an instrument having multiple offers to consummate, consummation may take place after all randomization has completed or else eliminated that security from consideration, in which case it may solicit or bid again, or choose to be dormant.) This may allow the market to operate fairly and without centralized services. For relatively sparsely traded instruments, a fully decentralized market may be ideal, whereas it is possible that for instruments that have many instances with frequent trading some centralized services may be beneficial.)

With the above-described addressing scheme, a smart financial instrument may be programmed or instructed to communicate only with a desired group of smart financial instruments, for example, by selecting specific ranges of IP addresses with subnet masking techniques.

According to some embodiments of the present invention, tokens associated with financial instruments need not be physical devices. Instead, the smart financial instruments as described above may also be implemented as virtual documents having logical tokens affixed thereto or embedded therein. For example, a smart financial instrument may exist solely in the form of one or more data packets in transit or as a data unit, a document or a database record in storage. The data packet(s) and database entries may securely record some or all financial parameters and other information concerning the financial instrument. In addition, the data packet(s) may include a token portion, such as an encrypted header or tag, that is addressable and/or traceable. Similarly, when stored or retrieved in the form of a data unit, the smart financial instrument may also comprise a token portion and a document portion. Intelligence functions of the token portion may be enabled with a software and network infrastructure with which the financial instrument interacts. Predetermined events and/or conditions may cause the token portion to spring into action, for example, to self-update relevant information, to perform self-reporting tasks, and to run other computing or communication scripts. The virtual financial instruments and their associated tokens may further cause new financial instruments and/or tokens to be generated, as described above, in split transactions or to accommodate units of transaction data.

Based on the foregoing description, it may be appreciated that the present invention offer a number of technological advantages. For example, embodiments of the present invention can provide improved financial instruments suitable for use within or external to accounts, which offer advanced features for valuation and compliance with reporting, tracking, taxation, regulatory, legal, and fiduciary requirements. Embodiments of the present invention may also provide advanced tracking, management, and reporting for transactions performed both within and outside of an account context. Furthermore, the present invention also enables or facilitates advanced transaction and trading environments (including a new stock market) in which these advanced instruments and their owners can operate.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for issuing, circulating and trading financial instruments having smart features, the method comprising:
   issuing, by a computer processor, a financial instrument comprising monetary value and physically attached to a token device, and wherein the token device comprises:
   a unique address including (a) a device identifier that indicates ownership, value, and transferability of the financial instrument and (b) a network address for tracking said token device that changes based on a current network location of the token device, at least a portion of said device identifier changes based on at least a portion of financial parameters of the financial instrument, a non-transitory computer memory to record the financial parameters, and one or more communication capabilities;

changing, by the computer processor, the network address based on the current network location of the token device;

changing, by the computer processor, at least a portion of the device identifier based on at least a portion of financial parameters of the financial instrument;

transferring, by the computer processor, the financial instrument based on the transferability of the financial instrument; and tracking, by the computer processor, the ownership, value, and transferability of the financial instrument based on the device identifier and the network address of the associated token device by communicating with the token device at least once subsequent the issuing of the financial instrument.

2. The method according to claim 1, further comprising:

causing, by the computer processor, the token device to authenticate to a server via a communication network and to report a current status of the financial instrument.

3. The method according to claim 2, wherein the reporting of the current status by the token device is triggered by a transaction involving the financial instrument.

4. The method according to claim 1, further comprising:

causing, by the computer processor, the token device to record at least one financial parameter of the financial instrument that has changed as a result of a transaction involving the financial instrument.

5. The method according to claim 1, wherein the financial instrument is a financial derivative referencing a second financial instrument, and the method further comprising causing the token device to:

detect, by the computer processor, a change in the second financial instrument; and update, by the computer processor, at least one financial parameter of the financial instrument based on the detected change in the second financial instrument and a derivative relationship between the financial instrument and the second financial instrument.

6. The method according to claim 1, further comprising:

issuing, by the computer processor, a second financial instrument comprising monetary value and physically attached to a second token device; and causing, by the computer processor, the first and second token devices to engage in peer-to-peer communications with one another, whereby the first and second token devices exchange information relevant to a transaction involving the first and second financial instruments.

7. The method according to claim 1, further comprising recording, by the computer processor, the financial parameters in an encrypted form.

8. The method according to claim 1, wherein the financial parameters comprise one or more parameters selected from a group consisting of:

a composition of the financial instrument;

a type or category of the financial instrument;

an asset class of the financial instrument;

a unique identifier that distinguishes the financial instrument from its peers;

a fixed value of the financial instrument;

a fluctuating value of the financial instrument and one or more rules for determining the fluctuating value;

a time or time period associated with a transaction related to the financial instrument;

an identification of a party in a transaction related to the financial instrument;

an identification of an issuer of the financial instrument;

an identification of a governmental authority to which to report a transaction related to the financial instrument;

an identification of an account, if the financial instrument is associated with the account;

a current status of the financial instrument;

an intent of a holder of the financial instrument to conduct one or more transactions; and a reference to another financial instrument, if the financial instrument is a financial derivative associated with said another financial instrument.

9. The method according to claim 1, further comprising encoding, by the computer processor, at least a portion of the financial parameters in the device identifier.

10. The method according to claim 1, further comprising configuring, by the computer processor, the token device to maintain or obtain a current time and date.

11. The method according to claim 1, further comprising providing, by the computer processor, the token device with a tamper-proof mechanism to prevent unauthorized alteration of the unique address.

12. The method according to claim 1, wherein the financial instrument includes a document portion wherein the transferability of the financial instrument is based upon co-presence and validity of the document portion and the token device.

13. A computer-implemented method for issuing, circulating and trading financial instruments having smart features, the method comprising:

issuing, by a computer processor, a financial instrument comprising monetary value and physically attached to a token device, and wherein the token device comprises:

a unique address including a device identifier that indicates ownership, value, and transferability of the financial instrument and a network address for tracking said token device that changes based on a current network location of the token device, at least a portion of said device identifier changes based on at least a portion of financial parameters of the financial instrument, non-transitory computer memory to record the financial parameters, and one or more communication capabilities;

changing, by the computer processor, the network address based on the current network location of the token device;

changing, by the computer processor, at least a portion of the device identifier based on at least a portion of financial parameters of the financial instrument;

transferring, by the computer processor, the financial instrument based on the transferability of the financial instrument; and tracking, by the computer processor, the ownership, value, and transferability of the financial instrument based on the device identifier and the network address of the associated token device by communicating with the token device at least once subsequent the issuing of the financial instrument.

* * * * *